United States Patent [19]

Yanadori et al.

[11] Patent Number: 4,585,573

[45] Date of Patent: Apr. 29, 1986

[54] HEAT STORAGE MATERIAL AND PROCESS FOR PRODUCING THE SAME

[75] Inventors: Michio Yanadori, Hachioji; Seigo Miyamoto, Takahagi; Keiichi Koike, Matsudo, all of Japan

[73] Assignee: Hitachi, Ltd., Tokyo, Japan

[21] Appl. No.: 447,678

[22] Filed: Dec. 7, 1982

[30] Foreign Application Priority Data

Dec. 9, 1981 [JP] Japan .............................. 56-196787
Feb. 10, 1982 [JP] Japan .............................. 57-18713

[51] Int. Cl.$^4$ .............................................. C09K 5/06
[52] U.S. Cl. ...................................... 252/70; 423/497
[58] Field of Search ......................................... 252/70

[56] References Cited

U.S. PATENT DOCUMENTS

| | | | |
|---|---|---|---|
| 4,189,394 | 2/1980 | Schröder et al. | 252/70 |
| 4,299,274 | 11/1981 | Campbell | 252/70 |
| 4,392,971 | 7/1983 | Kimura et al. | 252/70 |

FOREIGN PATENT DOCUMENTS

| | | | |
|---|---|---|---|
| 51-70193 | 6/1976 | Japan | 252/70 |
| 7038879 | 3/1982 | Japan | 252/70 |
| 7096079 | 6/1982 | Japan | |
| 138289 | 8/1984 | Japan | 252/70 |
| 7801037 | 8/1979 | Sweden | |

OTHER PUBLICATIONS

Lowenheim et al., *Faith, Keyes and Clark's Industrial Chemicals*, Fourth Edition, 1975, Wiley-Interscience, pp. 186–190.

*Primary Examiner*—Paul Lieberman
*Assistant Examiner*—Robert A. Wax
*Attorney, Agent, or Firm*—Antonelli, Terry & Wands

[57] ABSTRACT

A heat storage material is produced by adding water and slight amounts of substances for agglomerating residuals to industrial grade calcium chloride.

9 Claims, 11 Drawing Figures

HEAT STORAGE MATERIAL AND PROCESS FOR PRODUCING THE SAME

BACKGROUND OF THE INVENTION

This invention relates to a heat storage material for storing solar heat, electric power in midnight or the like and a process for producing the same.

When solar heat, electric power in midnight or the like is stored and utilized as a heat source for a heat pump type heater or a hothouse, a substance having a melting point in the temperature range of about 15° to 28° C. is desired as a latent-heat storage material.

It has heretofore been known, for example, disclosed in U.S. Pat. No. 4,189,394, that when a hydrate of calcium chloride ($CaCl_2$), namely, calcium chloride-hexahydrate ($CACl_2.6H_2O$) is used, a heat storage material having a melting point in a relatively low temperature range can be obtained. Since this material has a large amount of latent heat, is incombustible, and causes no environmental pollution, it is excellent as a heat storage material. However, the aforesaid U.S.P. relates to an invention of a nucleating agent, and no description is given therein about a production process. In particular, no description is given therein about a method for adjusting the melting point of a heat storage material so as to be in an arbitrary range of 15° to 28° C.

As a process for producing calcium chloride-hexahydrate, there is known, for example, a process comprising dissolving marble (calcium carbonate; $CaCO_3$) in hydrochloric acid (HCl) to generate carbon dioxide, evaporating the remaining waste solution, and then taking out the resulting calcium chloridehexahydrate. This process requires the employment of hydrochloric acid, is attended by dangers such as the evolution of carbon dioxide, and is expensive.

SUMMARY OF THE INVENTION

Objects of this invention are to provide a heat storage material having a melting point in a temperature range of about 15° to 28° C. and a process for producing the same safely and inexpensively.

This invention provides a heat storage material formed by adding water and slight amounts of substances for agglomerating residuals to industrial grade calcium chloride now used in a large amount, for example, for melting snow and for food additive, and a process for producing the same.

DESCRIPTION OF PREFERRED EMBODIMENTS

In this invention, calcium chloride to be used as a starting material for a heat storage material is produced from industrial grade calcium chloride. Industrial grade calcium chloride contains impurities but can be made usable as a starting material for a heat storage material by subjecting it to an appropriate treatment.

Therefore, there can be utilized inexpensive industrial grade calcium chloride which is formed as a waste in the production of calcium carbonate by the ammonia soda process.

Table 1 presents the results of analyzing the constitutents of four kinds of industrial grade calcium chloride.

TABLE 1

| Constituent | Calcium chloride for melting snow | Calcium chloride for food additive | Granular calcium chloride | Flaky calcium chloride |
|---|---|---|---|---|
| $CaCl_2$ | 76 | 74 | 72 | 73 |
| NaCl | 3 | 4 | 0.5 | 2.7 |
| $Fe_2O_3$ | 0.001 | 0.005 | 0.0007 | 0.0007 |
| $CaSO_4$ | 0.06 | 0.1 | 0.06 | 0.05 |
| Sludge | 4 | 1 | 3 | 2 |
| $H_2O$ | Balance | Balance | Balance | Balance |

All the industrial grade calcium chlorides contain more than 70% by weight of anhydrous $CaCl_2$, the main constituent of industrial grade calcium chloride.

They contain, besides $CaCl_2$(anhydrous), some of NaCl, trace amounts of $Fe_2O_3$ and $CaSO_4$, some of residuals such as small stones and dust, and balance of water ($H_2O$).

These industrial grade calcium chlorides have a high melting point of 80° C. or higher and hence cannot be utilized as the heat storage material at which this invention aims. Therefore, it is necessary to adjust the melting point by adding water to them.

Figure 1:
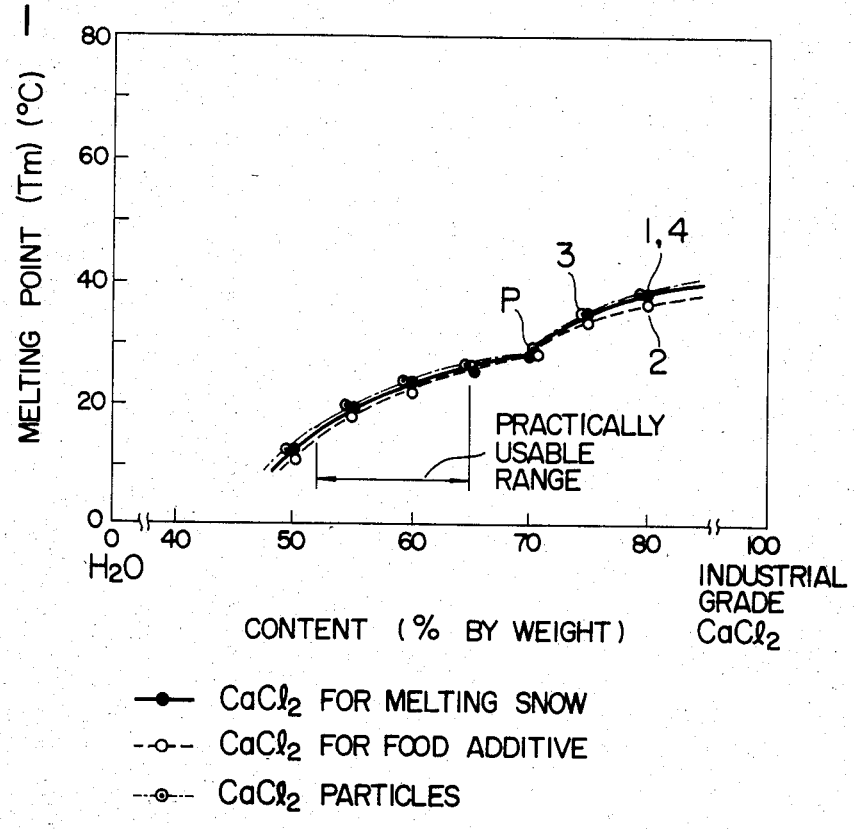
FIG. 1 is a graph showing a relationship between the percentage by weight of industrial grade calcium chloride and the melting point in the case where water is added to the industrial grade calcium chloride.

FIG. 1 shows the results of actually measuring the melting points of samples prepared by adding water to each of the industrial grade calcium chlorides in various proportions at room temperature. The axis of abscissa refers to industrial grade calcium chloride content (C) (% by weight), and the axis of ordinate to melting point Tm (°C.). In FIG. 1, the curve 1 shown by a symbol ● shows a result for industrial grade calcium chloride for melting snow, the curve 2 shown by a symbol ○ shows a result for industrial grade calcium chloride for food additive, and the curve 3 shown by a symbol ⊙ shows a result for granular industrial grade calcium chloride. Characteristic curve 4 of flaky industrial grade calcium chloride was about the same as the curve 1. With a decrease of the content (C) due to the addition of water, the melting point Tm is lowered. There is a folding point P (C=70%, Tm=28° C.), and with a decrease of the content (C), Tm keeps lowering. From the C-Tm curves, it can be seen that in order to obtain a heat storage material having a desired melting point (15° to 28° C.), it is sufficient to add industrial grade calcium chloride to water in a proportion of 52 to 70% by weight. However, in the case of a mixture having a content (C) of 65%–70% by weight, industrial grade calcium chloride which has a high melting point and hence is difficult to melt precipitates in the lower part of a heat storage tank while the mixture is used as a heat storage material. Since such a material is ineffective as a heat storage material, a mixture having a content (C) in the range of 65 to 70% by weight is difficult to use as a heat storage material. When industrial grade calcium chloride is used in such a range that the content (C) is less than 52% by weight, the melting point is very unstable. That is to say, the melting point changes in every heat cycle, and therefore such a mixture is difficult to use. Accordingly, for practical purposes, a mixture having a content (C) in the range of 52 to 65% by weight can preferably be used as a heat storage material. Such a mixture contains, e.g., concentrations of 36.44–49.4% by weight of anhydrous calcium chloride and 0.26–2.6% by weight of sodium chloride. A mixture having a content (C) higher than that at the folding point P (C=70% by weight) originally contains industrial grade calcium chloride particles remaining insoluble, and a mixture having a content (C) in such a range cannot be used. A starting heat storage material prepared in the mixing ratio described above is preferably placed in a vessel and heated in a warmwater bath. When such a procedure is carried out, residuals such as small stones and dust precipitate in the lower part, and a supernatant liquid good in transparency remains in the upper part. The supernatant liquid is taken out and then used as a heat storage material.

Figure 2:
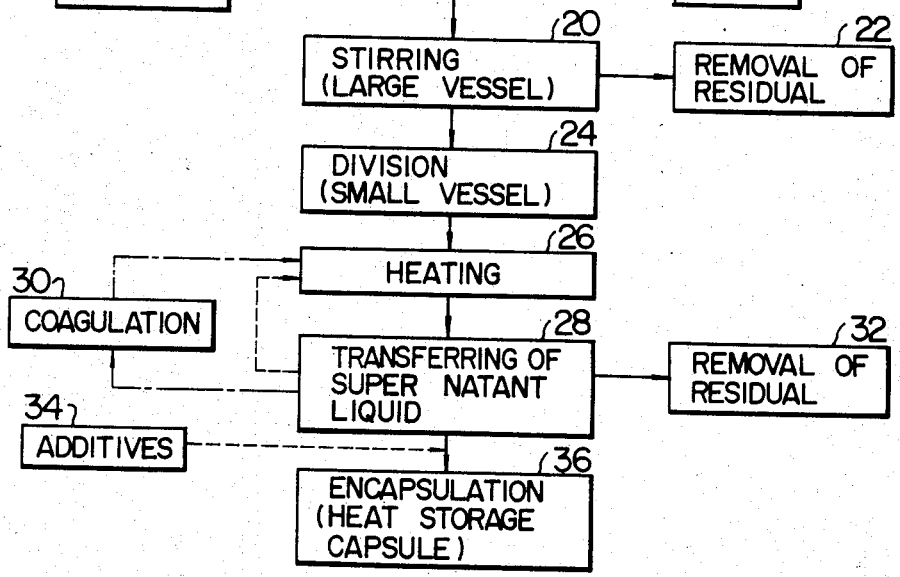
FIG. 2 is a flow chart of a process for producing the heat storage material according to one example of this invention.

FIG. 2 is a flow chart of the process for producing the heat storage material explained above.

Figure 3:
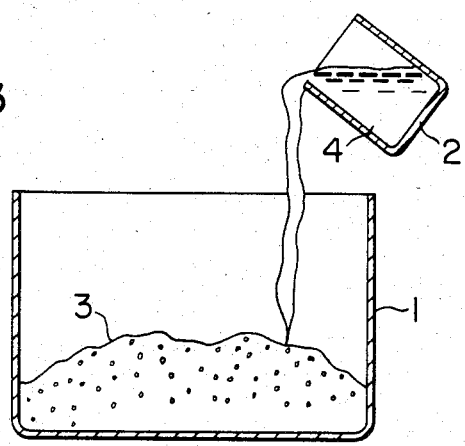
FIGS. 3 to 8 are concrete illustrations of the flow chart of FIG. 2.

Step 20 in FIG. 2 is a step of mixing and stirring a starting material 3 for heat storage material and a diluent 4 (e.g., water). In this step, as shown in FIG. 3, the starting material 3 is placed in a large vessel 1, and an adequate amount of the diluent 4 in a vessel 2 is placed in the large vessel 1 and mixed and stirred together with the starting material 3. In order to adjust a latentheat storage material to a desired melting point, the mixing ratio of the starting material 3 and the diluent 4 should previously be obtained by calculation. In order that the starting material may uniformly be dissolved in the diluent 4, they should sufficiently be stirred together by using a stirring rod or the like.

Figure 4:
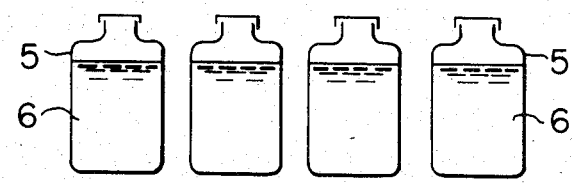

The thus stirred and mixed mixture 6 is transferred to small vessels 5 shown in FIG. 4 in the next step 24. In the procedure of transferring it to the small vessels 5, when precipitated residuals such as dust and impurities exist in the large vessel 1, they are removed (step 22).

Figure 5:
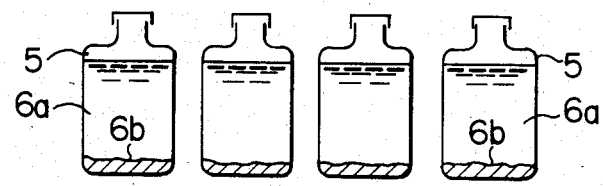

After being transferred to the small vessels 5, the mixture 6 is allowed to stand for some time. During this procedure, residuals 6b such as dust and impurities precipitate, as shown in FIG. 5, in the lower parts of the small vessels 5. In the upper parts, a supernatant liquid 6a remains. In step 28, only the supernatant liquid 6a in the small vessels 5 is transferred to other small vessels, and the residuals 6b are removed (step 32). When this procedure is repeated several times, the transparency of the supernatant liquid 6a is improved, and a heat storage material of high purity can be obtained.

Figure 6:
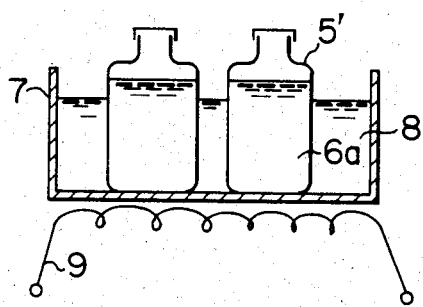

In order to further improve the transparency of the supernatant liquid 6a, it is advisable to heat it in step 26. In this case, small vessels 5' containing the supernatant liquid 6a are placed, as shown in FIG. 6, in a heating bath 7. The heat of a heater 9 as a heating source attached to the heating bath 7 is transmitted to a heat medium 8 (e.g., water or oil) contained in the heating bath 7, and transmitted from the heat medium 8 to the supernatant liquid 6a in the small vessels 5'. In order to improve the transparency of the supernatant liquid 6a still further, the small vessels 5' containing the supernatant liquid 6a are placed in a refrigerator or the like to coagulate the supernatant liquid 6a in step 30 and then placed in the heating bath 7 to melt it. The transparency is thereby still further improved.

The reasons why, in this invention, the mixture 6 is transferred from the large vessel 1 shown in FIG. 3 to the small vessels 5 shown in FIG. 4 are, for example, that (1) in placing the mixture 6 in the heating bath or refrigerator, it is handy to carry because it can be divided, (2) the mixture 6 can be subjected, in lots, to heating and cooling treatments, and (3) the heating time and the cooling time are reduced because the heat transfer area becomes large.

Figure 7:
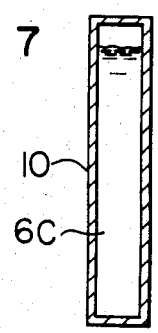
Figure 8:
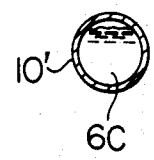

The thus prepared supernatant liquid 6a is used as a heat storage material, and is sometimes incorporated into small amounts of additives, for example, nucleating agents for preventing supercooling gelling agents for suppressing separation into two layers, and the like (step 34). Thereafter, in step 36, the heat storage material 6c is put in cylindrical heat storage capsules 10 shown in FIG. 7 or spherical heat storage capsules 10' shown in FIG. 8.

There are desirable ranges of temperature and time for conducting the heating in step 26 in FIG. 2.

Figure 9:
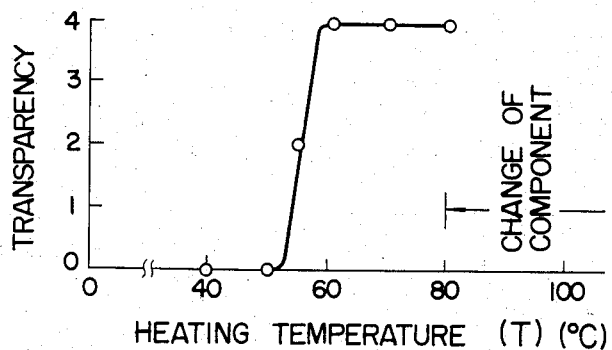
FIGS. 9 to 11 are graphs showing characteristics of the heat storage material of this invention.

FIG. 9 shows the relationship between the heating temperature T (°C.) and the transparency after heating for a time t (hr) of 1 hours. Along the axis of abscissa is plotted the heating temperature, and along the axis of ordinate is plotted the transparency in 5 grades (0 . . . completely invisible, 1 . . . invisible, 2 . . . a little visible, 3 . . . visible, 4 . . . clearly visible). As is obvious from FIG. 9, the heating temperature is preferably in the range of 60° to 80° C. When it is higher than 80° C., the components of the heat storage material change sometimes, and when it is lower than 60° C., the transparency is not improved.

Figure 10:
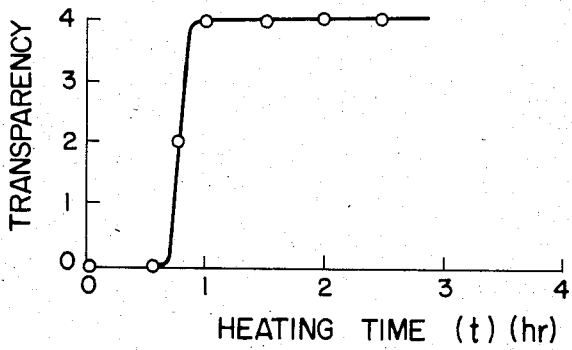

FIG. 10 shows a relationship between the heating time t (hr) and the transparency at 70° C. Along the axis of abscissa is plotted the heating time t (hr), and along the axis of ordinate is plotted, as in FIG. 9, in 5 grades (0, 1, 2, 3 and 4).

It can be seen from an experiment that the heating time is preferably 1 hour or more, and that when it is less than 1 hour, the transparency is very low. In the experiment, the heat storage material was placed in a 1-liter vessel made of transparent polycarbonate, and the transparency was judged by a degree to which an object on the other side of the vessel is visible through the vessel.

Sometimes the thus produced heat storage material supercools and releases no latent heat even when its temperature falls to a temperature lower than the solidifying point by 20° C. or more. Therefore, nucleating agents capable of facilitating solidification were sought for by a trail and error method. As a result, it was found that it was effective to add calcium hydroxide (Ca(OH)$_2$) and then add one or more substances selected from strontium oxide (SrO), strontinum phosphate (Sr$_2$(PO$_4$)$_2$), strontium hydroxide Sr(OH)$_2$ and strontium hydroxide-octahydrate (Sr$_2$(OH)$_2$.8H$_2$O). As to the adding amounts thereof, it is preferable to add 0.01 to 10% by weight of calcium hydroxide and then add 0.01 to 10% by weight of at least one substance selected from SrO, Sr$_2$(PO$_4$)$_2$, Sr(OH)$_2$ and Sr$_2$(OH)$_2$.8H$_2$O.

Calcium hydroxide Ca(OH)$_2$ has an effect of agglomerating residuals in a heat storage material which survive purification. If the residuals are suspended, the effect of a nucleating agent is lessened. The residuals are disadvantageous in that they increase the viscosity of heat storage material and damage convection heat transfer at the time of heat release. However, when calcium hydroxide is added, the residuals can be agglomerated, so that the disadvantages described above can be removed.

Figure 11:
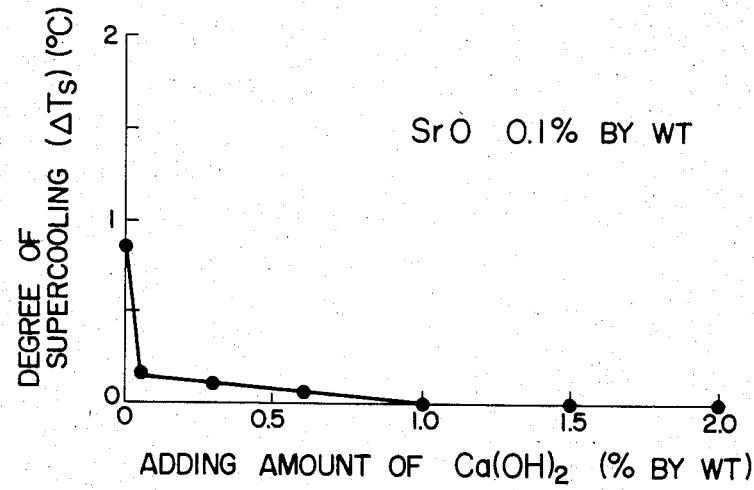

As the nucleating agent, a combination of Ca(OH)$_2$+SrO is the best. When this combination is used, the degree of supercooling becomes low as shown in FIG. 11. When 0.1% or SrO and 0.1% of Ca(OH)$_2$ are added, the degree of supercooling becomes very low. When 0.1% or SrO and 1.0% by weight of Ca(OH)$_2$ are added, the degree of supercooling becomes about 0° C. As a method for incorporating a heat storage material, it is preferable to incorporate Ca(OH)$_2$ and SrO so that they may partly be brought into contact with each other. The combined use of nucleating agents is remarkably effective in the wide range of 52 to 65% by weight in terms of the concentration of industrial grade calcium chloride, as shown in FIG. 1.

As described above, industrial grade calcium chloride contains about 0.5 to 4% by weight of NaCl, which has an effect of lowering the melting point of a heat storage material. That is to say, although the melting point of pure calcium chloride CaCl$_2$ is 30° C., it is lowered to about 28° C. if 0.5 to 4% by weight of NaCl is contained in the solution.

What is claimed is:

1. A heat storage material obtained by adding 52 to 65% by weight of industrial grade calcium chloride containing 70–76% by weight anhydrous calcium chloride, 0.5–4% by weight sodium chloride, impurities including sludge, and 17–24.5% by weight water, to water, to provide a composition, as the heat storage material, comprising anhydrous calcium chloride in a concentration of 36.44–49.4% by weight and sodium chloride in a concentration of 0.26–2.6% by weight, the balance being water such material having a stable melting point and not having calcium chloride precipitate therefrom while used as a heat storage material.

2. A heat storage material according to claim 1, wherein the heat storage material is obtained by further adding, as nucleating agents, calcium hydroxide and at least one substance selected from strontium oxide, strontium phosphate, strontium hydroxide and strontium hydroxide-octahydrate to the water and the industrial grade calcium chloride.

3. A heat storage material according to claim 2, wherein the calcium hydroxide is added in an amount of 0.01 to 10% by weight and the at least one substance selected from the group consisting of strontium oxide, strontium phosphate, strontium hydroxide and strontium hydroxide-octahydrate is added in an amount of 0.01 to 10% by weight.

4. A process for producing a heat storage material, which comprises adding 52 to 65% by weight of industrial grade calcium chloride containing 70–76% by weight anhydrous calcium chloride, 0.5–4% by weight sodium chloride, impurities including sludge, and 17–24% by weight water, to water in a vessel, heating the resulting mixture at a temperature of 55°–80° C. for a time of at least one hour to precipitate impurities unsuitable for a heat storage material in the lower part of the vessel and to improve transparency, and then taking out the supernatant liquid in the vessel to give a composition, as said heat storage material, comprising anhydrous calcium chloride in a concentration of 36.44–49.4% by weight and sodium chloride in a concentration of 0.26–2.6% by weight, the balance being water, such material having a stable melting point and not having calcium chloride precipitate therefrom while used as a heat storage material.

5. A process for producing a heat storage material according to claim 4, wherein as nucleating agents 0.1 to 10% by weight of calcium hydroxide and 0.01 to 10% by weight of at least one substance selected from strontium oxide, strontium phosphate, strontium hydroxide and strontium hydroxide-octahydrate are added to said supernatant liquid.

6. A heat storage material according to claim 3, wherein there is used as nucleating agents calcium hydroxide and strontium oxide.

7. A heat storage material according to claim 2, wherein the material contains a sufficient amount of nucleating agents such that supercooling of the material is substantially prevented.

8. Product formed by the process of claim 4.

9. Product formed by the process of claim 5.

* * * * *